(12) United States Patent
Lin et al.

(10) Patent No.: US 10,306,267 B2
(45) Date of Patent: May 28, 2019

(54) SYSTEM, METHOD, AND RECORDING MEDIUM FOR COMPRESSING AERIAL VIDEOS

(71) Applicant: International Business Machines Corporation, Armonk, NY (US)

(72) Inventors: Chung-Ching Lin, White Plains, NY (US); Sharathchandra U. Pankanti, Darien, CT (US); John R. Smith, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 14/840,140

(22) Filed: Aug. 31, 2015

(65) Prior Publication Data

US 2017/0064332 A1    Mar. 2, 2017

(51) Int. Cl.
| | |
|---|---|
| *G06K 9/50* | (2006.01) |
| *H04N 19/60* | (2014.01) |
| *H04N 5/265* | (2006.01) |
| *H04N 5/232* | (2006.01) |
| *G06T 9/00* | (2006.01) |
| *G06K 9/62* | (2006.01) |

(52) U.S. Cl.
CPC ............ *H04N 19/60* (2014.11); *G06T 9/004* (2013.01); *H04N 5/23238* (2013.01); *H04N 5/265* (2013.01); *G06K 9/6211* (2013.01)

(58) Field of Classification Search
CPC .... H04N 19/60; H04N 5/23238; H04N 5/265; H04N 7/18
USPC ........................................................... 348/36
See application file for complete search history.

(56) References Cited

U.S. PATENT DOCUMENTS

| | | | | |
|---|---|---|---|---|
| 4,949,391 | A * | 8/1990 | Faulkerson | G06F 3/0238 382/313 |
| 2008/0205790 | A1 * | 8/2008 | Wear | G06T 3/0068 382/284 |
| 2009/0022422 | A1 * | 1/2009 | Sorek | G06T 3/4038 382/284 |
| 2010/0265314 | A1 * | 10/2010 | Nakashio | G06T 3/4038 348/36 |
| 2011/0090337 | A1 * | 4/2011 | Klomp | G01C 11/025 348/144 |
| 2012/0154520 | A1 * | 6/2012 | Putraya | G06T 3/4038 348/36 |

(Continued)

*Primary Examiner* — Jessica M Prince
*Assistant Examiner* — Patrick E Demosky
(74) *Attorney, Agent, or Firm* — Rahan Uddin, Esq.; McGinn IP Law Group, PLLC

(57) ABSTRACT

A compression system for compressing a video received from an imaging device, the compression system including a transformation estimation device configured to estimate, based on pixel transformations between a first frame and a second frame of the video, a transformation matrix, an encoding device configured to encode the second frame as an increment with the first frame based on the transformation matrix generated by the transformation device, a compression device configured to compress the increments into compressed data, and a reconstruction device configured to reconstruct the first frame and the second frame using the transformation matrix generated by the transformation estimation device.

11 Claims, 6 Drawing Sheets

(56) References Cited

U.S. PATENT DOCUMENTS

| | | | |
|---|---|---|---|
| 2012/0200703 A1* | 8/2012 | Nadir | G02B 27/644 348/144 |
| 2014/0347481 A1 | 11/2014 | Kostrzewski et al. | |
| 2014/0368608 A1* | 12/2014 | Ishida | H04N 5/23238 348/36 |
| 2015/0003731 A1 | 1/2015 | Stojancic et al. | |
| 2015/0029306 A1* | 1/2015 | Cho | H04N 5/23267 348/38 |
| 2015/0138399 A1* | 5/2015 | Ma | G06K 9/00624 348/239 |
| 2015/0363663 A1* | 12/2015 | Tombari | G06K 9/4633 382/170 |

* cited by examiner

SYSTEM, METHOD, AND RECORDING MEDIUM FOR COMPRESSING AERIAL VIDEOS

This invention was made with Government support under Contract No.: HR0011-13-C-0022 awarded by Defense Advanced Research Projects Agency (DARPA). The Government has certain rights in this invention.

BACKGROUND

The present invention relates generally to image processing, and more particularly, but not by way of limitation, relating a system, a method, and a recording medium for compressing aerial videos.

Bandwidth for transmitting airborne video imagery to ground is limited and is often significant bottleneck for example, viewing the video as, drones are capturing the video. The available bandwidth is significantly lower than the data capture rate. Therefore, conventional compression methods are not suitable.

Conventional methods have used subsampling with temporal and spatial data, MPEG4 using spatial, temporal, and channel redundancies, on demand and operator initiated, analytics based on where event summaries are sent, and stitching to send a panorama. However, such conventional compression methods do not provide enough details, enough compression, only provide information in real time, provide all information in the videos such that significant bottleneck is created, and the stitching has stitching-based artifacts, for example, due to parallax.

Other conventional methods have detected a region of interest, but such methods are only good for static cameras. Some conventional methods use background data to improve the data compression ratio, but such methods do not work well for a camera mounted on a moving platform (e.g., a drone).

Even further, another conventional method has proposed to use global motion (homography) to initialize the block matching algorithm, but this method does not further improve a data compression ratio. Also, a conventional method has proposed to use homography to model global motion and to estimate the intermediate frames within a same frame group. The aforementioned method is limited by the frame group sizes since the method cannot have a large frame group.

All these conventional methods are limited in their applications. For example, the methods, if utilized in a moving camera, do not compress well because of the frame to frame motion. The conventional methods do not explicitly recover this motion and hence may not deliver high compression of aerial videos.

SUMMARY

In view of the foregoing and other problems, disadvantages, and drawbacks of the aforementioned background art, an exemplary aspect of the disclosed invention provides a system, method, and non-transitory recording medium for aerial video compression.

In an exemplary embodiment, the present invention can provide a compression system for compressing a video received from an imaging device, the compression system including a transformation estimation device configured to estimate, based on pixel transformations between a first frame and a second frame of the video, a transformation matrix, an encoding device configured to encode the second frame as an increment with the first frame based on the transformation matrix generated by the transformation device, a compression device configured to compress the increments into compressed data, and a reconstruction device configured to reconstruct the first frame and the second frame using the transformation matrix generated by the transformation estimation device.

Further, in another exemplary embodiment, the present invention can provide a compression method for compressing a video received from an imaging device, the compression method including estimating, based on pixel transformations between a first frame and a second frame of the video, a transformation matrix, encoding the second frame as an increment with the first frame based on the transformation matrix, compressing the increments into compressed data, and reconstructing the first frame and the second frame using the transformation matrix Even further, in another exemplary embodiment, the present invention can provide a non-transitory computer-readable recording medium recording a compression program for compressing a video received from an imaging device, the program causing a computer to perform estimating, based on pixel transformations between a first frame and a second frame of the video, a transformation matrix, encoding the second frame as an increment with the first frame based on the transformation matrix, compressing the increments into compressed data, and reconstructing the first frame and the second frame using the transformation matrix.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
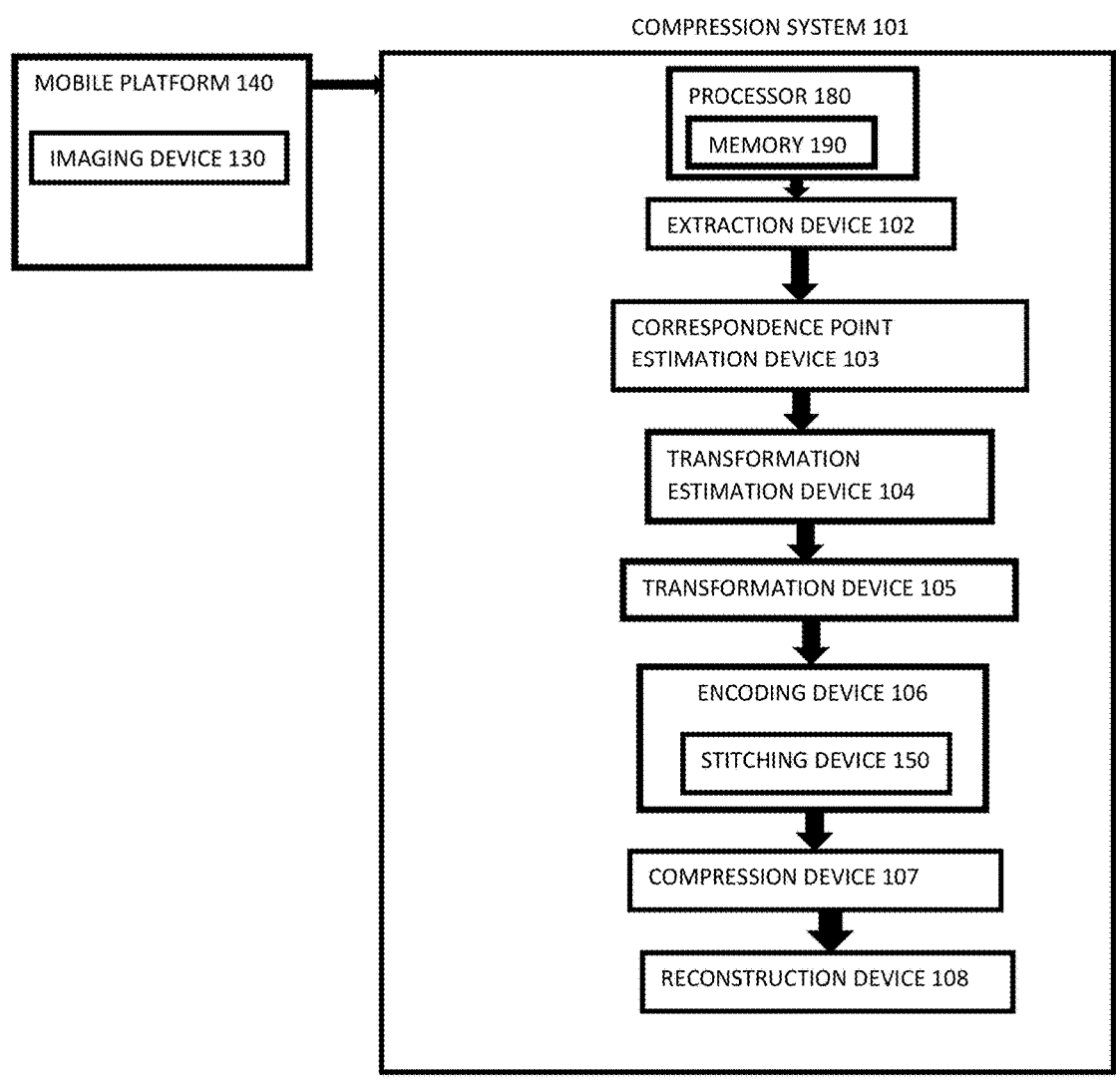
FIG. 1 exemplarily shows a block diagram illustrating a configuration of a compression system.

The invention will now be described with reference to the drawing Figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

With reference now to FIG. 1, the compression system 101 comprises an extraction device 102, a correspondence point estimation device 103, a transformation estimation device 104, a transformation device 105, an encoding device 106, a compression device 107, and a reconstruction device 108. The compression system 101 includes a processor 180 and a memory 190, the memory 190 storing instructions to cause the processor 180 to execute each device of the compression system 101.

Figure 4:
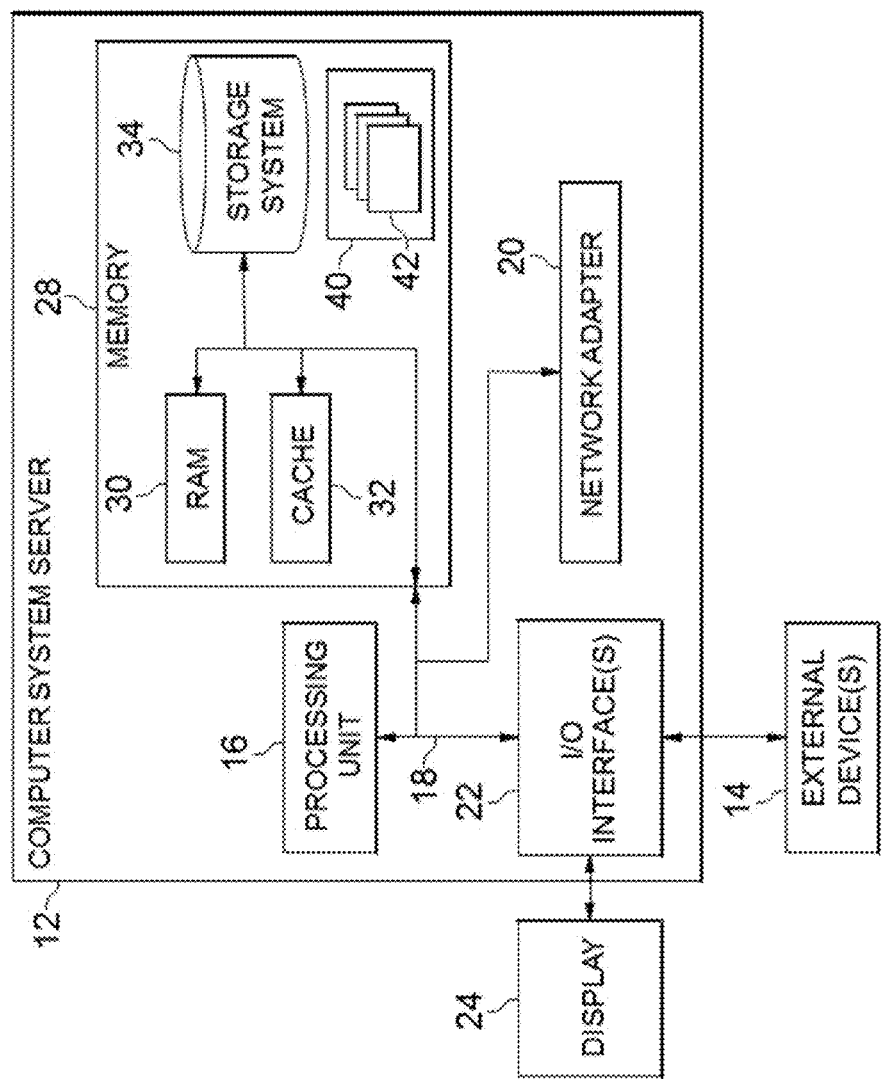
FIG. 4 depicts a cloud computing node according to an embodiment of the present invention.
Figure 5:
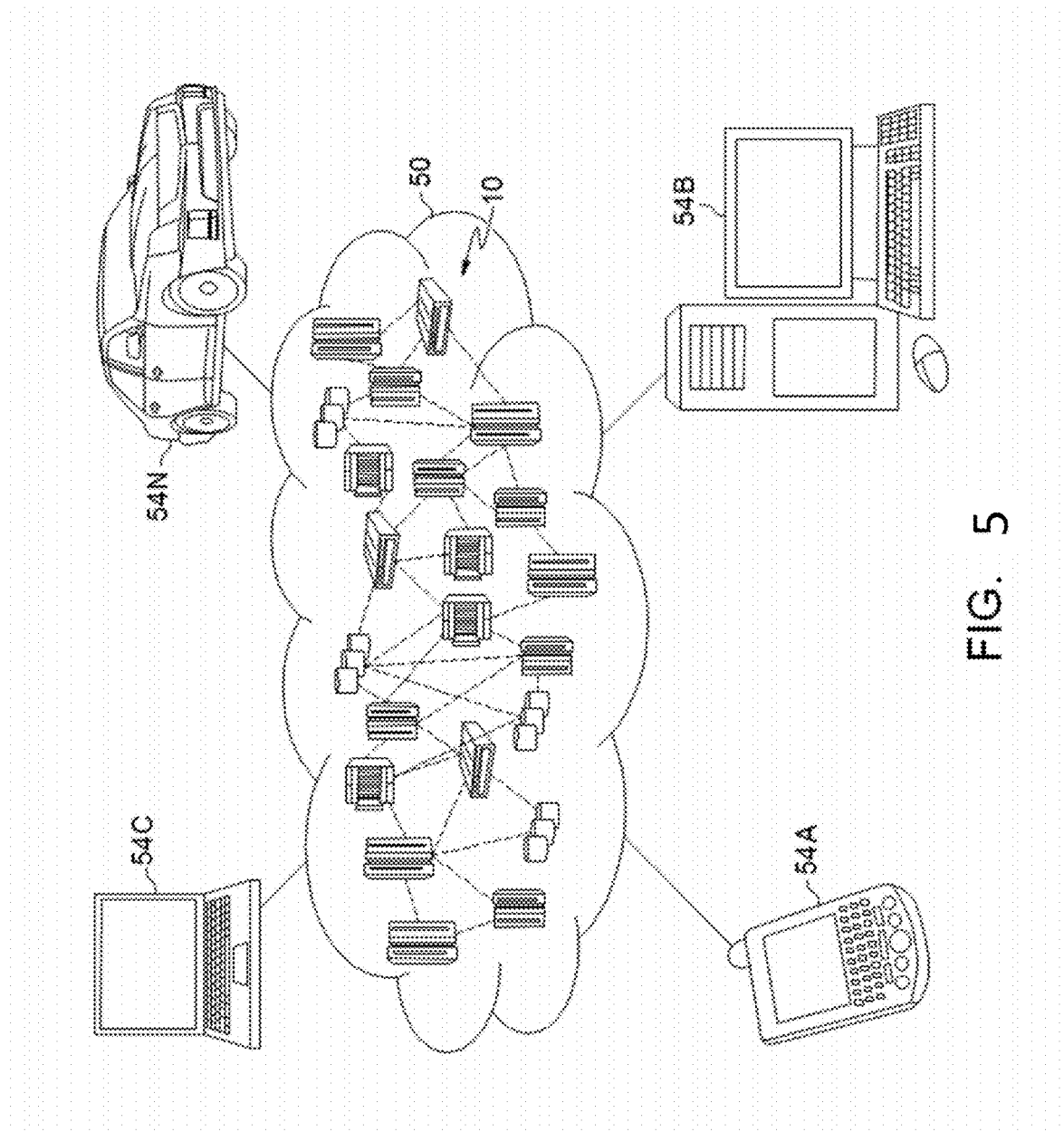
FIG. 5 depicts a cloud computing environment according to an embodiment of the present invention.
Figure 6:
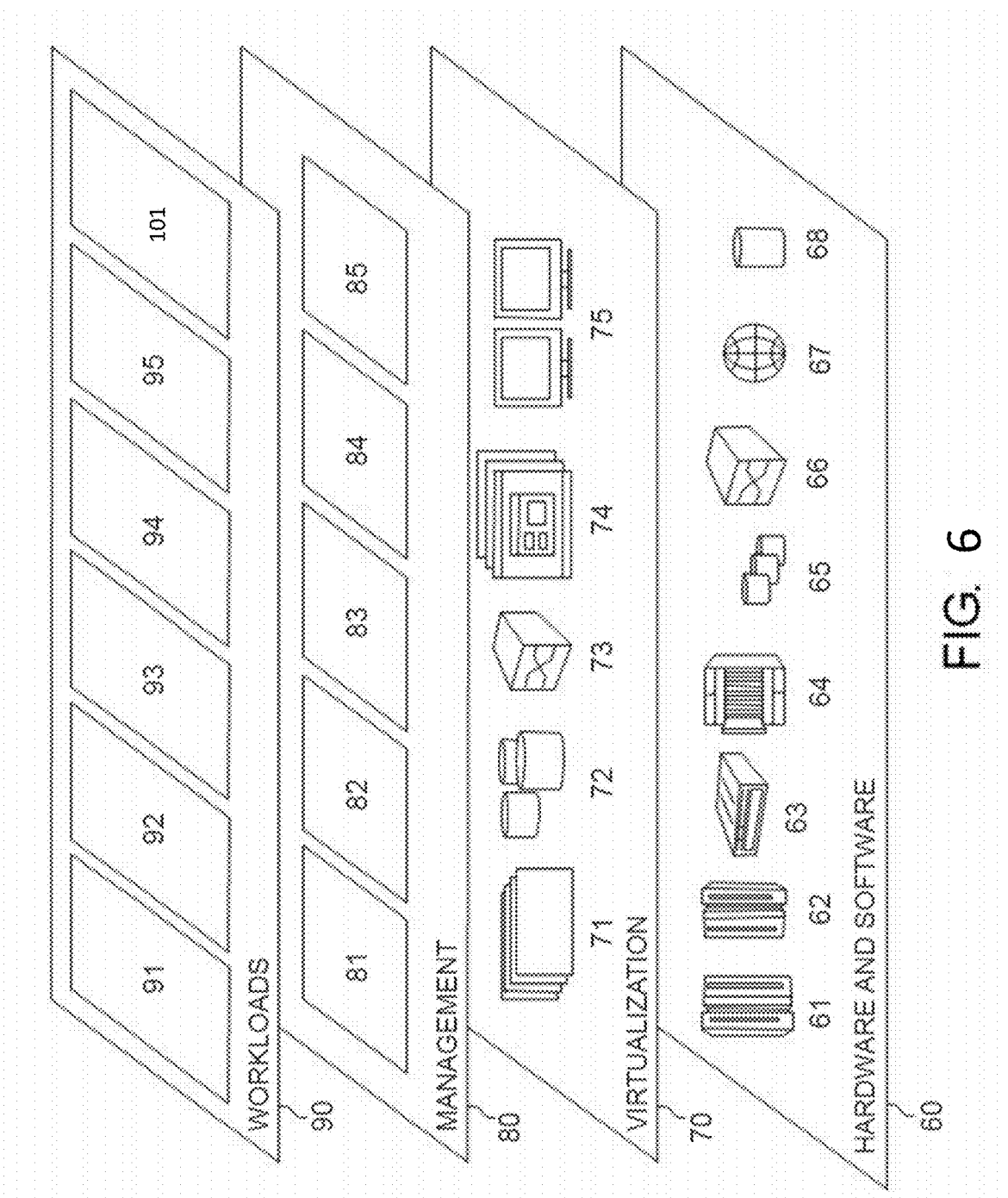
FIG. 6 depicts abstraction model layers according to an embodiment of the present invention.

Although as shown in FIGS. 4-6 and as described later, the computer system/server 12 is exemplarily shown in cloud computing node 10 as a general-purpose computing device which may execute in a layer the compression system 101 (FIG. 6), it is noted that the present invention can be implemented outside of the cloud environment.

The compression system 101 receives video from an imaging device 130. The imaging device 130 includes a camera and can be disposed on a mobile platform 140 such as, and not limited thereto, a UAV or aeronautical vehicle. The video is taken from the mobile platform 140 such that the mobile platform 140 is moving while the video is being taken. The imaging device 130 outputs each frame of video captured to the compression system 101.

The extraction device 102 extracts feature points from each frame of the video captured by the imaging device. The feature points can be translational invariant representations of edge orientations. The feature points can be scale invariant feature transform (SIFT) points. The feature points can include corner points of the frames.

The correspondence estimation device 103 estimates corresponding points matching each other between successive frames input into the compression system 101 from the imaging device 130.

More specifically, the correspondence point estimation device 103 receives a first frame and a second frame from the extraction device 102 which has extracted feature points. The correspondence point estimation device 103 estimates corresponding points matching each other from the first frame and the second frame. The matching correspondence points include the feature points extracted by the extraction device 102. The process of edge detection and identifying corner points may be done according to conventional methods.

The correspondence point estimation device 103 is further optionally configured to discard the point matches based on bi-directional matches between the first frame and the second frame.

The correspondence point estimation device 103 is further configured to discard the point matches between the first frame and the second frame based on inlier/outlier criteria using, for example, random sample consensus (RANSAC).

The un-discarded matches of the correspondence point estimation device 103 are output as a correspondence solution.

The transformation estimation device 104 receives the correspondence solution from the correspondence point estimation device 103 and estimates the underlying geometric transformation between the successive frames. In other words, the transformation estimation device 104, based on pixel transformations between the first frame and the second frame, uses, for example, an optimization function to estimate and generate a transformation matrix of a new position of the pixels.

This process will repeat until it fails to estimate a reliable transformation. In this video segment, a global transformation matrix of each frame will be calculated, for example as in the previously disclosed invention of U.S. patent application Ser. No. 14/732,345, the entire contents of which is incorporated herein by reference.

The transformation device 105 aligns each frame to the first frame using the global transformation matrix generated by the transformation estimation device 104. The transformation can include similarity, affine, homography, or others of their piecewise counterparts. The transformation device 105 aligns each frame in succession such that an overlapping area is aligned between each frame using the global transformation matrix.

The encoding device 106 includes a stitching device 150. The stitching device 150 processes each successive frame of the video to stitch the new frame to the previous frame (i.e., the second frame to the first frame) into a single panorama image. The stitching device 150 removes the overlapping area of the first frame and the second frame, and each successive frame thereafter to form the single panorama image as exemplarily shown in FIG. 2.

The encoding device 106 encodes each frame in the segment in terms of the residual and the global transformation matrix generated by the transformation device 105.

Figure 2:
FIG. 2 exemplarily shows a mini-mosaic created from the mini-panorama of a flight video.

FIG. 2 exemplarily depicts a single panorama image of a video segment having 2637 frames in a five minute flight tape. As can be seen, the stitching device 150 forms the single panorama image. It should be noted that the encoded device 106 encodes the images based on the transformation matrix.

Several mechanisms can be used on the stitching field during image alignment, including tolerance to parallax. The previously disclosed invention of U.S. patent application Ser. No. 14/732,345, the entire contents of which is incorporated herein by reference, disclosed an invention that included a new method that incorporated several mechanisms to make the resulting panorama look more accurate in order to depict the actual image. To mitigate perspective distortion that occurs in the conventional As-Projective-As-Possible (APAP) related art, the disclosed invention linearizes the homography in the regions that do not overlap with any other image, and then automatically estimates a global similarity transform using a subset of corresponding points in overlapping regions. Further, that disclosed invention extrapolated smoothly between the homography and the global similarity in the overlapping regions, using the linearized homography (affine) and the global similarity transform in the non-overlapping regions. The smooth combination of two stitching fields (e.g., using homography/linearized homography and global similarity) enables the stitching device 102 of the instant Application to produce (a) a fully continuous and smooth stitching field with no bending artifacts, (b) improved perspective in the non-overlapping regions using a global similarity transform, and (c) full benefits of the state-of-the-art alignment accuracy, as offered by APAP.

A summary of a method of U.S. patent application Ser. No. 14/732,345 is provided in the following. First, the moving DLT method to estimate the local homography is described, and an approach to linearize it in the non-overlapping regions is provided. Then, the computation of a global similarity transformation between the reference and the target images is explained. Since many similarity transformations are possible, the disclosed invention of U.S. patent application Ser. No. 14/732,345 automatically chooses the one with the lowest rotation angle as the best candidate. Finally, the details of the warp, which is constructed by combining the homography or its linearized version across the whole image with the global similarity, are presented.

An example aspect of the stitching device 150 is to provide stitching for the new frame to the previous frame, using the feature points extracted by the extraction device in each frame to comprise of a point set from each of the plurality of frames, matching the points of interest and reducing outliers, grouping the matched points of interest in a plurality of groups, determining a similarity transformation with smallest rotation angle for each grouping of the matched points, generating virtual matching points on non-overlapping area of the plurality of image views, generating virtual matching points on overlapping area for each of the plurality of image frames, and calculating piecewise projective transformations for the plurality of image frames.

The points of interest representations can be translational invariant representations of edge orientations. The points of interest representations can be scale invariant feature transform (SIFT) points. The method can be stored in a non-transitory computer readable medium and executed by a processor. The plurality of frames of a video are remotely captured from an aerial view. Each group of the matched plurality points is used to calculate an individual similarity transformation, and then the rotation angles corresponding to the transformations are examined, and the one with the smallest rotation angle is selected. When extracting the points of interest, for each of the plurality of frames, the extraction device 102 extracts the key points and texture descriptors.

The processor of the stitching device 150 of the present invention calculates piecewise projective transformations for the plurality of image frames on the overlapping area of the first frame and the second frame. The processor determines the similarity transformation with a smallest rotation angle for each grouping of the match points. The processor calculates linearized transformations for the plurality of image views. The processor uses weighted linearized transformations to extrapolate non-overlapping areas. The processor generates virtual matching points on non-overlapping area of the plurality of image views, and the processor generates virtual matching points on overlapping area for each of the plurality of image views. The points of interest representations are translation-invariant representations of edge orientations. The points of interest representations are scale invariant feature transform (SIFT) points. The plurality of views of a scene are remotely captured from an aerial view and stored on the non-transitory computer readable medium for execution by the processor. Each group of the matched plurality points is used to calculate an individual similarity transformation, then the rotation angles corresponding to the transformations are examined and the one with the smallest rotation angle is selected by the processor.

A system including a non-transitory computer readable medium and a processor can execute the method of the disclosed invention.

The encoding device 106 outputs the single panorama image that is stitched together by the stitching device 150 to the compression device 107.

The compression device 107 passes the increments through conventional algorithms leveraging channel, spatial, and temporal redundancies to form compressed data to be sent. Examples of conventional compression algorithms include and are not limited to, MPEP and AVI.

For example, the original frames of FIG. 2 was approximately 190 MB but the compressed version after passing through the above compression system is approximately 20 MB.

The reconstruction device 108 receives the compressed data from the compression device 107 and reconstructs each frame using the residuals and the transformation matrix generated by the transformation estimation device 104. That is, each individual frame of the video sequence is able to be reconstructed by the reconstruction device 108 using the residuals and the transformation matrix. In other words, each frame of the original aerial video can be dramatically compressed, sent, and then each frame of the original aerial video can be reconstructed using the transformation matrix.

Therefore, the use of geometric transformation to relate successive frames to align them to infer overlapping regions and use this as a basis for reducing the redundancy and compression.

Figure 3:
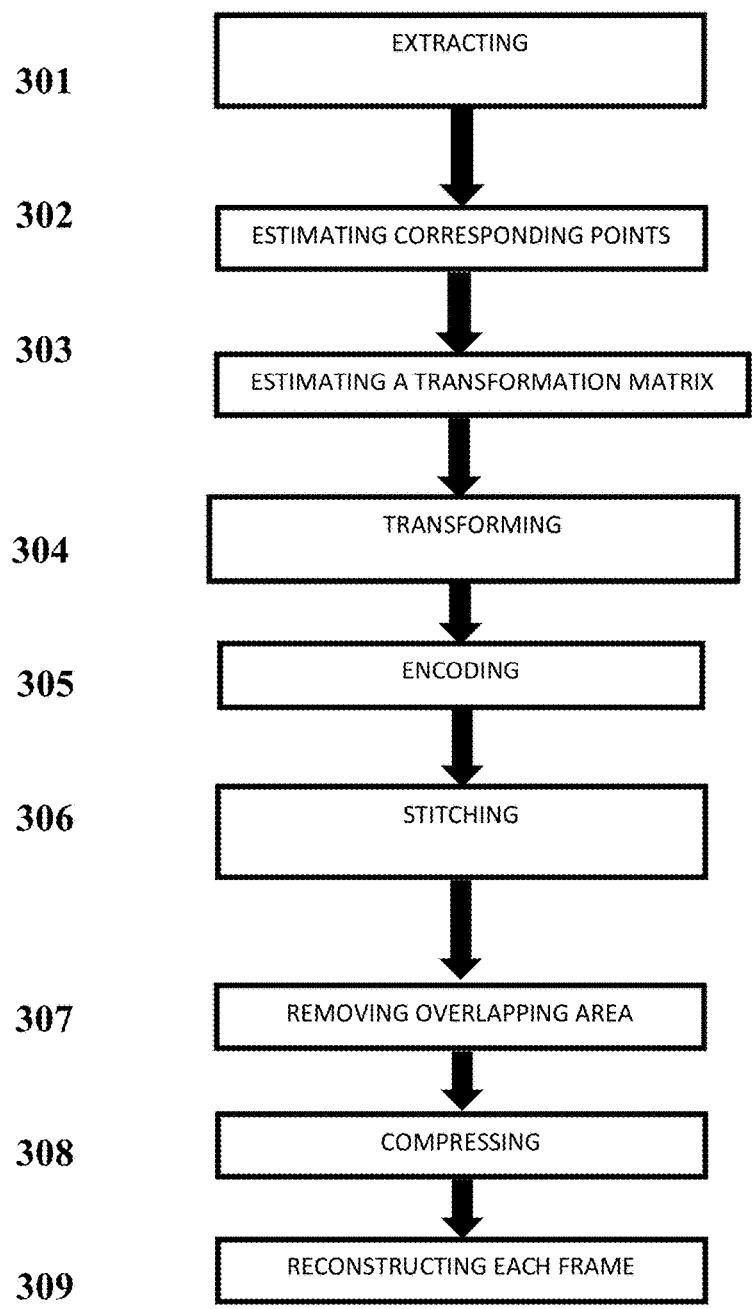
FIG. 3 exemplary shows a flow chart for a compression method.

FIG. 3 shows a high level flow chart for a compression method 300.

Step 301 extracts feature points from each frame of the video captured by the imaging device 130.

Step 302 estimates corresponding points matching each other between successive frames of the video captured by the imaging device 130. More specifically, step 302 receives at least a first frame, and a second frame, and a plurality of frames thereafter including the feature points extracted in step 301. Step 302 estimates corresponding points matching each other from the first frame and the second frame. The matching correspondence points include the feature points extracted by step 301.

Step 302 further discards point matches based on bi-directional matches between the first frame and the second frame and discards the point matches between the first frame and the second frame based on inlier/outlier criteria.

Step 303 estimates the underlying geometric transformation between the successive frames based on the un-discarded matches of step 302. Step 303, based on pixel transformations between the first frame and the second frame (each successive frame thereafter), and uses, for example, an automation function to generate a transformation matrix of a new position of the pixels. Step 303 will repeat until it fails to estimate a reliable transformation. In this video segment, a global transformation matrix of each frame will be calculated.

Step 304 transforms each frame to the first frame, by alignment, using the global transformation matrix generated by step 303. In other words, Step 304 aligns each frame in succession such that an overlapping area is aligned between each frame using the global transformation matrix.

Step 305 encodes each frame in the segment in terms of the residual and the global transformation matrix generated by Step 304. Step 305 encodes each successive frame for a given video sequence into increments for each successive frame.

Step 306 stitch processes each successive frame to stitch the new frame to the previous frame (i.e., the second frame to the first frame) into a single panorama image corresponding each frame of the video.

Step 307 removes the overlapping area of the first frame and the second frame, and each successive frame thereafter to form the single panorama image as exemplarily shown in FIG. 2.

Step 308 compresses the single panorama image by passing the increments through conventional algorithms leveraging channel, spatial, and temporal redundancies to form compressed data to be sent.

Step 309 receives the compressed data and reconstructs each frame of the original video using the residuals and the transformation matrix.

It should be noted that the exemplary embodiment described herein references the first frame and the second frame of the video. However, the compression system, method, and non-transitory computer readable medium and a processor execute the embodiment for each successive frame of a video. That is, the described embodiment processed a third frame with reference to the second frame and so on. In this manner, each prior frame of the video is processed with the next frame to form a single panoramic image for compressing and sending.

The exemplary embodiments described herein have advantages over the conventional methods such as, and not limited to, the use of geometric transformation to relate successive frames to align them to infer overlapping regions and the use of this transformation as a basis for reducing the redundancy and compression.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the compression system 101 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A compression system for compressing a video received from an imaging device, the compression system comprising:
    a transformation estimation device configured to estimate, based on pixel transformations between a first frame and a second frame of the video, a transformation matrix;
    an extraction device configured to extract feature points from the first frame and the second frame of the video captured by the imaging device;
    an encoding device configured to encode the second frame as an increment with the first frame and to delete a portion of the second frame that overlaps with the first frame based on the transformation matrix generated by the transformation device;
    a compression device configured to compress the increments into compressed data, the compressed data including the entire first frame and only a remaining portion of the second frame that does not overlap with the first frame after the portion of the second frame is deleted;
    a reconstruction device configured to reconstruct the first frame and the remaining portion of the second frame using the transformation matrix generated by the transformation estimation device,
    a transformation device configured to transform the second frame and the first frame using the transformation matrix generated by the transformation estimation device such that there is an overlapping area of the first frame and the second frame as the portion, the overlapping area being deleted from the second frame,
    wherein the encoding device comprises a stitching device configured to stitch an entirety of the first frame together with the remaining portion of the second frame after the deletion of the portion of the second frame that overlaps with the first frame so as to form a single panorama image,
    wherein the stitching device of the encoding device provides stitching for the second frame to the first frame to form the increment comprising the single panorama image, using the feature points extracted by the extraction device in each frame to comprise of a point set from each of the first frame and the second frame, matching the points of interest and reducing outliers, grouping the matched points of interest in a plurality of groups, determining a similarity transformation with smallest rotation angle for each grouping of the matched points, generating virtual matching points on non-overlapping area of the plurality of image views, generating virtual matching points on overlapping area for each of the plurality of image frames, and calculating piecewise projective transformations for the plurality of image frames.

2. The compression system according to claim 1, wherein the feature points comprise translational invariant representations of edge orientations of the first frame and the second frame.

3. The compression system according to claim 1, wherein the feature points comprise scale invariant feature transform (SIFT) points.

4. The compression system according to claim 1, further comprising a correspondence estimation device configured to estimate corresponding points matching each other between the first frame and the second frame based on the feature points.

5. The compression system according to claim 1,
    wherein the reconstruction device reconstructs the first frame and the second frame from the single panorama image using the transformation matrix generated by the transformation estimation device by reforming the complete second frame combining the remaining portion of the second frame after the deletion of the portion of the second frame that overlaps with the first frame with the overlapping area of the first flame and the second frame.

6. The compression system according to claim 4, wherein the correspondence point estimation device is further configured to discard the corresponding points matching each other based on one of bi-directional matches between the first frame and the second frame.

7. The compression system according to claim 1, wherein the transformation estimation device generates the transformation matrix based on each successive frame, and
wherein the encoding device deletes a portion of each successive frame that overlaps with a previous frame based on the transformation matrix generated by the transformation device.

8. The compression system according to claim 1, wherein the imaging device is disposed on a mobile platform, thereby video is taken from a moving image device.

9. The compression system according to claim 1, wherein the transformation comprises similarity, affine, homography, or their piecewise counterparts.

10. A compression method for compressing a video received from an imaging device, the compression method comprising:
estimating, based on pixel transformations between a first frame and a second frame of the video, a transformation matrix;
extract feature points from the first frame and the second frame of the video captured by the imaging device;
encoding the second frame as an increment with the first frame and deleting a portion of the second frame that overlaps with the first frame based on the transformation matrix;
compressing the increments into compressed data, the compressed data including the entire first frame and only a remaining portion of the second frame that does not overlap with the first frame after the portion of the second frame is deleted;
reconstructing the first frame and the remaining portion of the second frame using the transformation matrix; and
transforming the second frame and the first frame using the transformation matrix generated by the estimating such that there is an overlapping area of the first frame and the second frame as the portion, the overlapping area being deleted from the second frame,
wherein the encoding further stitches an entirety of the first frame together with the remaining portion of the second frame after the deletion of the portion of the second frame that overlaps with the first frame so as to form a single panorama image,
wherein the stitching further includes stitching for the second frame to the first frame to form the increment comprising the single panorama image, using the feature points extracted in each frame to comprise of a point set from each of the first frame and the second frame, matching the points of interest and reducing outliers, grouping the matched points of interest in a plurality of groups, determining a similarity transformation with smallest rotation angle for each grouping of the matched points, generating virtual matching points on non-overlapping area of the plurality image views, generating virtual matching points on overlapping area for each of the plurality of image frames, and calculating piecewise projective transformations for the plurality of image frames.

11. A non-transitory computer-readable recording medium recording a compression program for compressing a video received from an imaging device, the program causing a computer to perform:
estimating, based on pixel transformations between a first frame and a second frame of the video, a transformation matrix;
extract feature points from the first frame and the second frame of the video captured by the imaging device;
encoding the second frame as an increment with the first frame and deleting a portion of the second frame that overlaps with the first frame based on the transformation matrix;
compressing the increments into compressed data, the compressed data including the entire first frame and only a remaining portion of the second frame that does not overlap with the first frame after the portion of the second frame is deleted;
reconstructing the first frame and the remaining portion of the second frame using the transformation matrix; and
transforming the second frame and the first frame using the transformation matrix generated the estimating such that there is an overlapping area of the first frame and the second frame as the portion, the overlapping area being deleted from the second frame,
wherein the encoding further stitches an entirety of the first frame together with the remaining portion of the second frame after the deletion of the portion of the second frame that overlaps with the first frame so as to form a single panorama image,
wherein the stitching further includes stitching for the second frame to the first frame to form the increment comprising the single panorama image, using the feature points extracted in each frame to comprise of a point set from each of the first frame and the second frame, matching the points of interest and reducing outliers, grouping the matched points of interest in a plurality of groups, determining a similarity transformation with smallest rotation angle for each grouping of the matched points, generating virtual matching points on non-overlapping area of the plurality of image views, generating virtual matching points on overlapping area for each of the plurality of image frames, and calculating piecewise projective transformations for the plurality of image frames.

\* \* \* \* \*